US012592909B2

(12) United States Patent　　　　(10) Patent No.:　US 12,592,909 B2

Rosomakho　　　　　　　　　　　　(45) Date of Patent:　　Mar. 31, 2026

(54) SYSTEMS AND METHODS FOR ENDPOINT PROCESS METADATA BASED POLICY ENFORCEMENT

(71) Applicant: Zscaler, Inc., San Jose, CA (US)

(72) Inventor: Yaroslav Rosomakho, Thatcham (GB)

(73) Assignee: Zscaler, Inc., San Jose, CA (US)

( * ) Notice: Subject to any disclaimer, the term of this patent is extended or adjusted under 35 U.S.C. 154(b) by 99 days.

(21) Appl. No.: 18/440,007

(22) Filed: Feb. 13, 2024

(65) Prior Publication Data

US 2025/0260666 A1　　Aug. 14, 2025

(51) Int. Cl.
*G06F 21/00*　　　(2013.01)
*H04L 9/40*　　　(2022.01)

(52) U.S. Cl.
CPC ...... *H04L 63/0227* (2013.01); *H04L 63/1425* (2013.01); *H04L 63/166* (2013.01)

(58) Field of Classification Search
CPC ............ H04L 63/0227; H04L 63/1425; H04L 63/166
See application file for complete search history.

(56) References Cited

U.S. PATENT DOCUMENTS

| | | | |
|---|---|---|---|
| 2016/0191509 A1* | 6/2016 | Bestler | H04L 63/0876 |
| | | | 713/193 |
| 2021/0351995 A1* | 11/2021 | J S | H04L 63/0236 |
| 2024/0291816 A1* | 8/2024 | Hulick | H04L 63/0245 |
| 2025/0190185 A1* | 6/2025 | Hanson | G06F 8/71 |

* cited by examiner

*Primary Examiner* — Kendall Dolly
(74) *Attorney, Agent, or Firm* — Baratta Law PLLC; Lawrence A. Baratta, Jr.; Ryan Odessa

(57)　　　　　ABSTRACT

Systems and methods for endpoint application metadata based policy enforcement include monitoring traffic via a cloud, the traffic being monitored inline between one or more endpoints and one or more destinations; identifying, within a request from an endpoint, endpoint process metadata associated with an endpoint process used to make the request; processing the endpoint process metadata; and performing one or more actions on the request based on the processing. The endpoint process metadata can be collected by a connector application executing on the one or more endpoints, and forwarded to the cloud in-band therefrom.

14 Claims, 6 Drawing Sheets

600

SYSTEMS AND METHODS FOR ENDPOINT PROCESS METADATA BASED POLICY ENFORCEMENT

FIELD OF THE DISCLOSURE

The present disclosure generally relates to network and cloud security. More particularly, the present disclosure relates to systems and methods for endpoint process metadata based policy enforcement.

BACKGROUND OF THE DISCLOSURE

The number of endpoints in customer cloud environments is rising. This is due to enterprise networks being cloud-based, having applications, resources, and other destinations moved to the cloud. Managing traffic to and from endpoints and destinations is becoming increasingly comprehensive as enterprises do not have the ability to directly manage every endpoint used to access their data. By not having complete control of software running on the many endpoint devices utilized to access enterprise data and resources, it is difficult to accurately enforce cybersecurity policy. This results in an increased risk for the enterprise data residing on unsecured and unmanaged devices as well as the security risks in access to the Internet. Having visibility into the software responsible for originating traffic flows from endpoint devices enables cybersecurity services to make better decisions at an endpoint process level, which allows for early anomaly detection and new threat protection capabilities. The present disclosure provides systems and methods for collecting and utilizing endpoint process metadata for policy enforcement, and model training purposes.

BRIEF SUMMARY OF THE DISCLOSURE

The present disclosure relates to systems and methods for endpoint process metadata based policy enforcement. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include monitoring traffic via a cloud, the traffic being monitored inline between one or more endpoints and one or more destinations; identifying, within a request from an endpoint, endpoint process metadata associated with an endpoint process used to make the request; processing the endpoint process metadata; and performing one or more actions on the request based on the processing.

The steps can further include wherein the one or more actions include blocking the request, allowing the request, and alerting a user of the endpoint. The request can be forwarded to the cloud via a connector application executing on the endpoint. The connector application can be adapted to collect endpoint process metadata from an endpoint process used to make the request. The connector application can be adapted to forward the endpoint process metadata to the cloud in-band with the request. The endpoint process metadata can include one or more of a signor name, signature timestamp, product name, product version, original file name, executable hash, Process Identity (PID), process name, process owner, process running duration of the endpoint process, and other properties provided by the endpoint operating system. When the endpoint process metadata includes the product version of the endpoint process, the steps can further include processing the endpoint process metadata to determine if the product version of the endpoint process is the latest version available or an approved version; and performing one or more actions on the request based thereon. Responsive to determining the product version of the endpoint process is not the latest version available or not an approved version, the steps can include blocking the request and alerting a user of the endpoint. The steps can further include logging the endpoint process metadata. The steps can further include providing a customer of the cloud an inventory of all endpoint processes being utilized on their endpoints based on the logging.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for endpoint process metadata based policy enforcement. In various embodiments, the present systems include collecting metadata from one or more endpoint processes such as applications, web browsers, and the like. This metadata is then sent in-band with a request to a cloud for processing. The cloud is adapted to enforce various cybersecurity services by monitoring network traffic inline. Based on processing the endpoint process metadata sent in-band with a request from an endpoint, the cloud can determine whether to allow the request or perform one or more other actions. By employing the systems described herein, the cloud can extend zero trust security down to the endpoint process level. Additionally, the by logging such endpoint process metadata, customers can be provided with accurate inventories of endpoint processes which are used by their endpoints.

§ 1.0 Cybersecurity Monitoring and Protection Examples

Figure 1A:
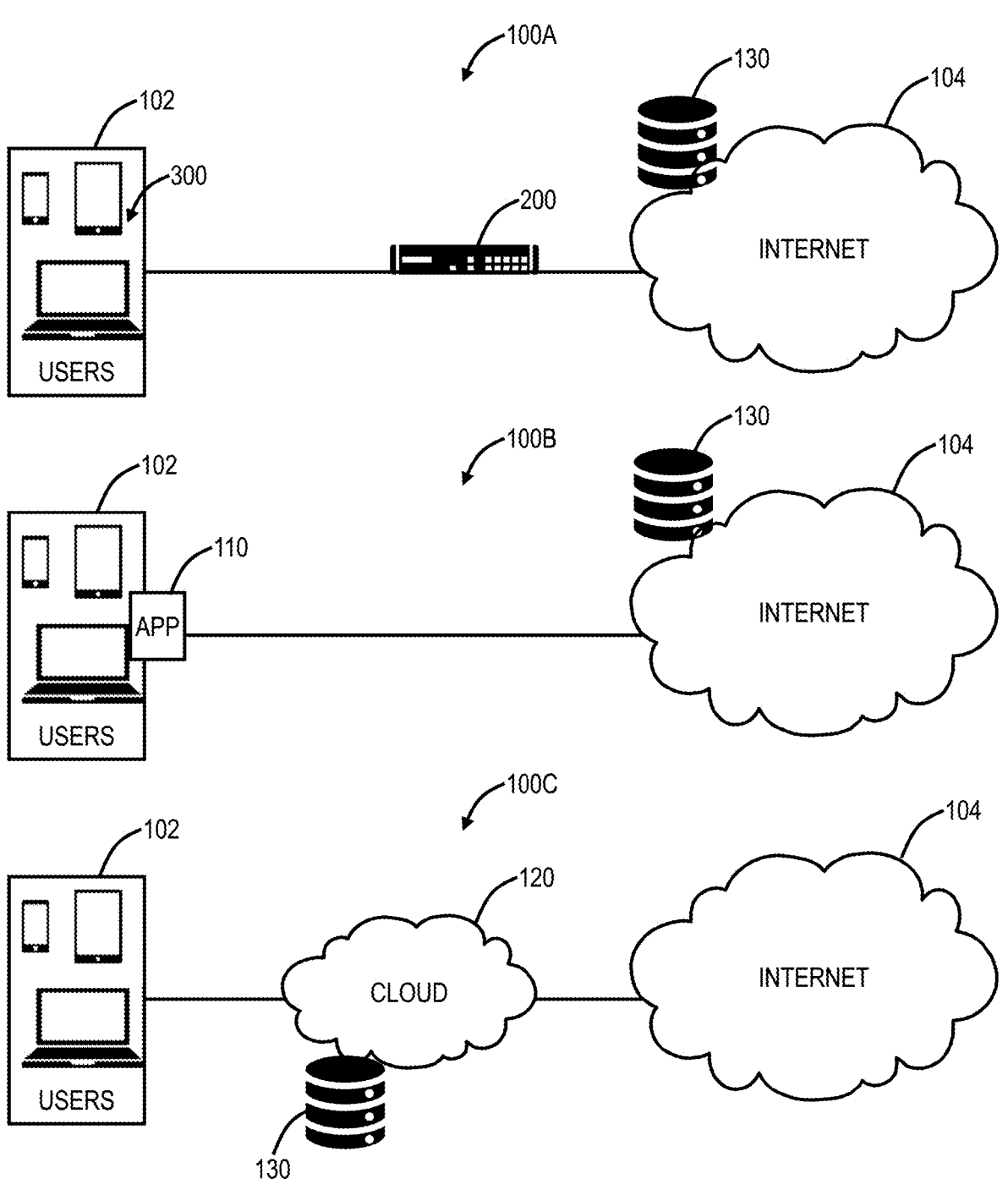
FIG. 1A is a network diagram of three example network configurations of cybersecurity monitoring and protection of a user.
Figure 2:
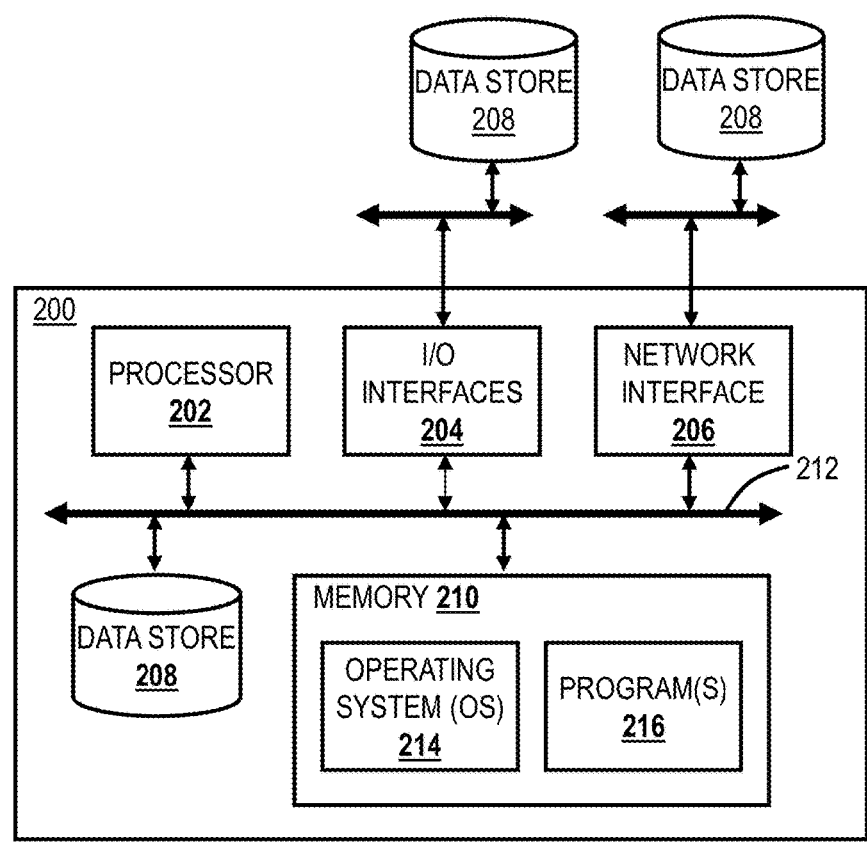
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 (connector application) that is executed on the computing device 300. The connector application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the connector application 110 in the network configuration 100B and the server 200 in the network configuration 100A. Logically, the cloud 120 can be viewed as an overlay network between endpoints 102 and the Internet 104 (and cloud services, SaaS, other destinations, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
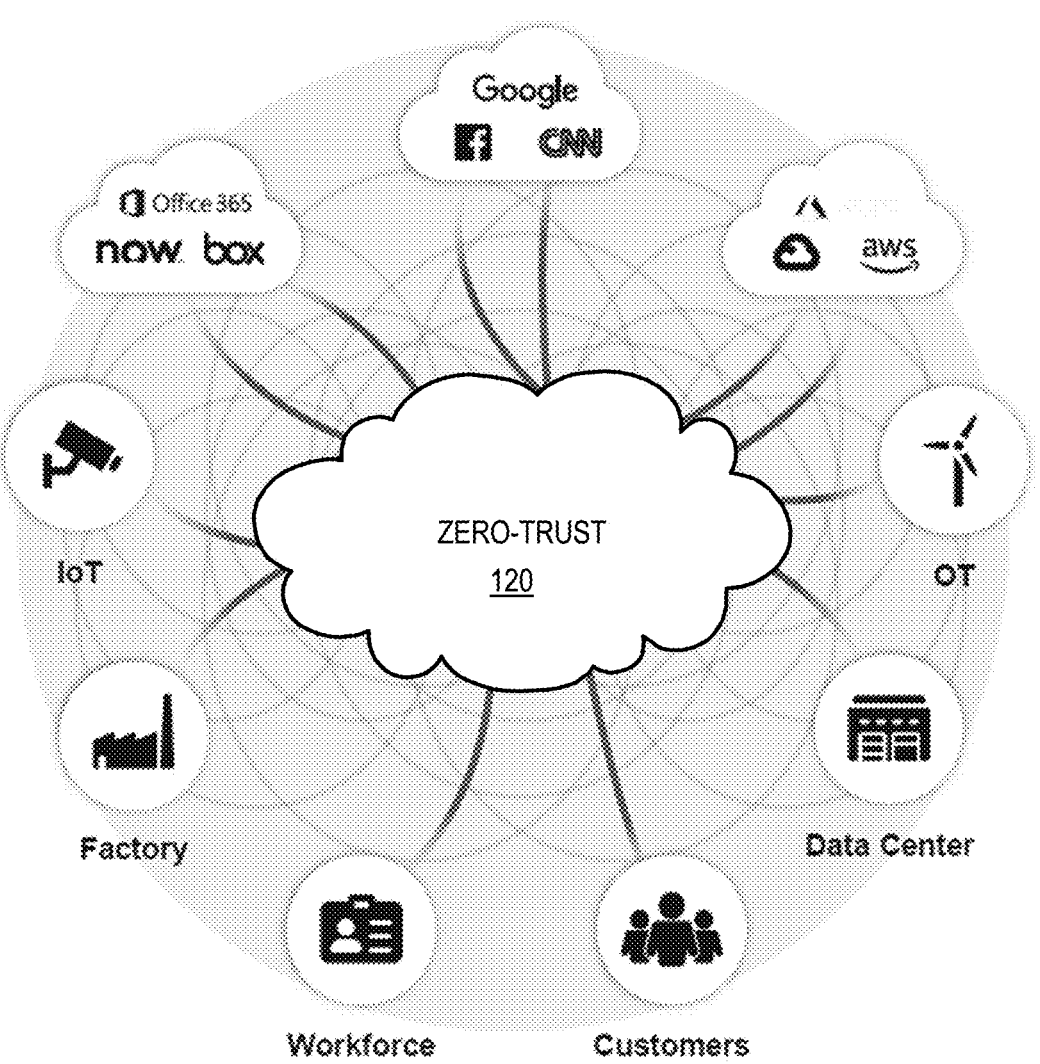
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a endpoint's 102 activity. That is, the log data 130 is not merely confined to specific activity (e.g., an endpoint's 102 social networking activity on a specific site, an endpoint's 102 search requests on a specific search engine, etc.), that is, when the endpoint 102 is a user.

§ 2.0 Example Server Architecture

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

§ 3.0 Example Computing Device Architecture

Figure 3:
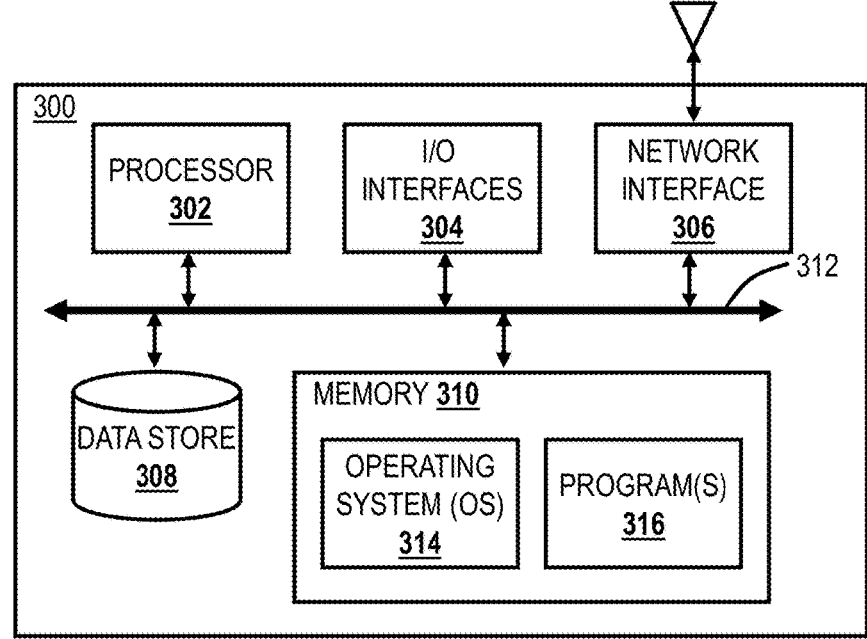
FIG. 3 is a block diagram of a computing device.

FIG. 3 is a block diagram of a computing device 300, which may be realize an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The connector application 110 can be one of the example programs.

§ 4.0 Application for Traffic Forwarding and Monitoring

Again, the network configuration 100B includes a connector application 110 that is executed on the computing device 300. The connector application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the connector application 110 can perform similar functionality as the cloud 120, as well as coordinated functionality with the cloud 120.

Figure 4:
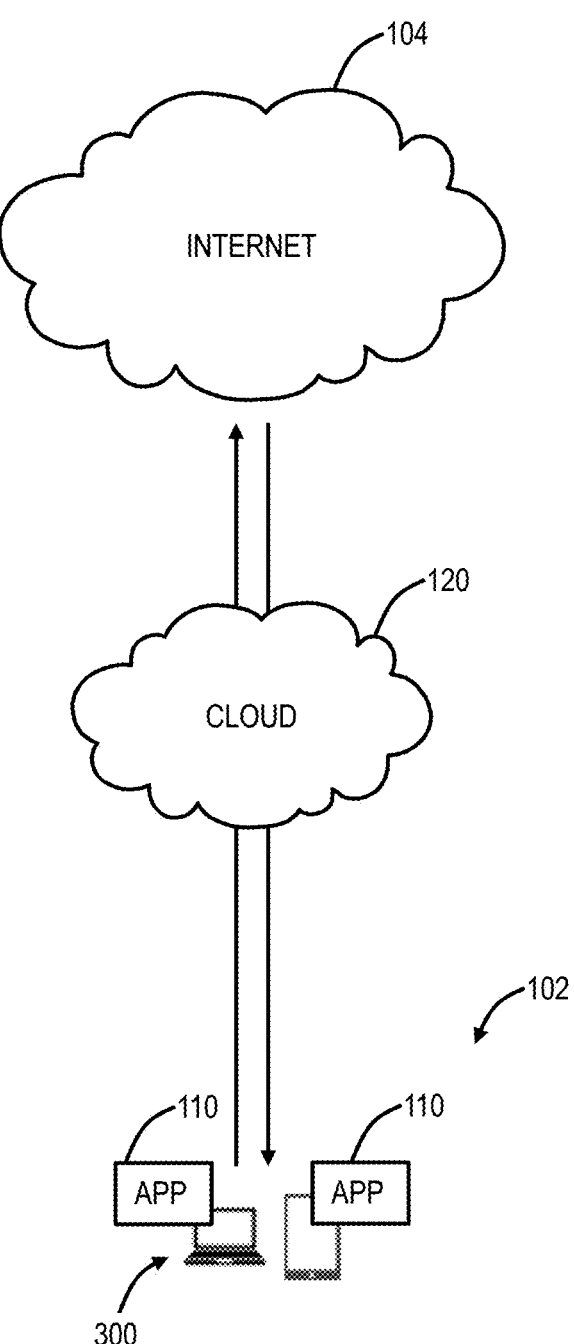
FIG. 4 is a diagram of an exemplary network configuration illustrating an application on computing devices configured to operate through the cloud.

FIG. 4 is a network diagram of an exemplary network configuration illustrating a connector application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The connector application 110 can automatically forward user traffic with the cloud 120 as well as ensuring that security and access policies are enforced, regardless of device, location, operating system, or application. The connector application 110 automatically determines if an endpoint 102 is looking to access the open Internet 104, a SaaS app, or an internal app running in public, private, or the datacenter and routes mobile traffic through the cloud 120. The connector application 110 can support various cloud services, including ZIA, ZPA, ZDX, etc., allowing the best in class security with zero trust access to internal applications. As described herein, the connector application 110 can also be referred to as a connector application.

The connector application 110 is configured to auto-route traffic for seamless user experience. This can be protocol as well as application-specific, and the connector application 110 can route traffic with a nearest or best fit node of the cloud 120. Further, the connector application 110 can detect trusted networks, allowed applications, etc. and support secure network access. The connector application 110 can also support the enrollment of the computing device 300 prior to accessing applications, the internet, or any services provided by the cloud 120. The connector application 110 can uniquely detect the endpoints 102 based on fingerprinting the computing device 300, using criteria like device model, platform, operating system, device posture, etc. The connector application 110 can support Mobile Device Management (MDM) functions, allowing IT personnel to deploy and manage the computing devices 300 seamlessly. This can also include the automatic installation of client and SSL certificates during enrollment. Finally, the connector application 110 provides visibility into device and app usage of the computing device 300, when a user is the endpoint 102 utilizing the computing device 300.

The connector application 110 supports a secure, lightweight tunnel between the computing device 300 and the cloud 120. For example, the lightweight tunnel can be HTTP-based. With the connector application 110, there is no requirement for PAC files, an IPSec VPN, authentication cookies, or user setup.

§ 5.0 Endpoint Process Based Policy Enforcement and Logging

As described herein, the cloud 120 is adapted to monitor, log, and enforce policy on traffic inline. As part of offering cybersecurity through the example network configurations 100A, 100B, 100C, a large amount of cybersecurity data is obtained. This cybersecurity data can include user data, device data, traffic data (such as user-destination transactions), and the like. Various embodiments of the present disclosure focus on using this cybersecurity data along with a customer's data to perform various security tasks including developing customer machine learning models and enforcing policies.

Figure 5:
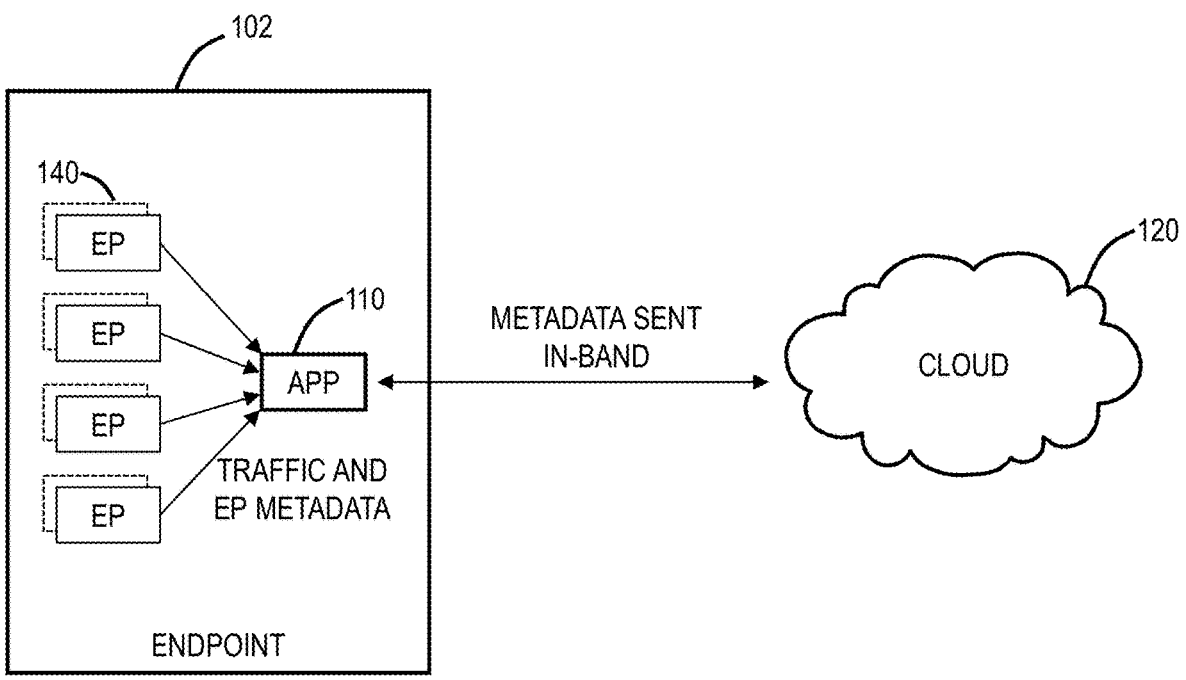
FIG. 5 is a flow diagram of a network configuration including an endpoint, a connector application, and the cloud.

FIG. 5 is a flow diagram of a network configuration including an endpoint 102, a connector application 110, and the cloud 120. Again, the endpoint 102 can be a user utilizing a computing device 300, an Internet-of-Things (IoT) device, and any customer specific endpoint such as infrastructure and the like adapted to communicate through the cloud 120. Again, an endpoint 102 can be configured to have the connector application 110 executing thereon. The connector application 110 is adapted to act, and can be contemplated, as a gateway for the endpoint for forwarding traffic to the cloud 120, enforce policy, collect endpoint 102 data, and the like. Logically, the cloud 120 can be viewed as an overlay network between one or more endpoints 102 and one or more destinations such as the Internet 104, cloud services, SaaS, etc. as described the cloud 120 is adapted to monitor traffic between the one or more endpoints and destinations inline.

Endpoints 102 can have various Endpoint Processes (EP) 140 operating thereon. For example, end endpoint 102 being a user device can have various applications installed thereon which can be utilized to communicate with the internet 104. In this example, the various applications are contemplated as the endpoint processes 140. In various embodiments, an endpoint process 140 can be any software installed on an endpoint 102 which is adapted to be used to access the internet 104, cloud 120, etc. For example, the present disclosure contemplates an endpoint process 140 as an application, a web browser, or any other process or software of the like. Thus, the connector application 110 is adapted to intercept traffic from any endpoint process 140 and forward the traffic to the cloud 120, or any of the cloud-provided cybersecurity services described herein, in-band with the traffic.

The present disclosure proposes various systems and methods for extracting additional information from the various endpoint processes 140 found on an endpoint 102. For example, when a new traffic flow is initiated from the endpoint 102 to the cloud 120, via the connector application 110, the connector application 110 can be adapted to also send endpoint process 140 specific metadata along with the traffic. In one use case, when the endpoint 102 is a user device operating a web browser, responsive to a new flow of traffic being initiated from the web browser, the connector application 110 can extract metadata from the web browser and forward the extracted web browser metadata to the cloud 120. In this example, the user device is the endpoint 102 and the web browser is the endpoint process 140. The cloud 120 can identify endpoint process metadata within the traffic and perform the processing of the metadata based thereon. The cloud 120 can then process the metadata and enforce policy, and/or log the data for future use. Based on the processing of the metadata, the cloud 120 and/or the connector application 110 can be adapted to perform one or more actions. These actions include allowing the traffic, blocking the traffic, alerting a user of the endpoint 102, etc. The alerting can include instructing the user to update software of the endpoint process, use a different endpoint process, etc. (further described herein). In various embodiments, the alerting can be provided via the application 110 executing on the user device, for example via a push notification or the like. Additionally, an alert can include instructions for remediating the alert, again, for example, providing instructions for how to update the software of an endpoint process, or providing recommendations for other endpoint processes available on the endpoint.

In various embodiments, the cloud 120 is adapted to log the metadata in log data 130. The logged metadata can then be used by the cloud 120 to train various Artificial Intelligence (AI) models, Machine Learning (ML) models etc. The logging and utilization of the metadata can be performed on a per-customer basis. That is, metadata can be logged and kept separate for each customer of the cloud 120 and its various security services. Similarly, the cloud 120 can enforce metadata-based policy (further described herein) on a per-customer basis. For example, different customers of the cloud 120 can have different policies enforced in their respective environments. Based thereon, the cloud 120 can enforce these policies based on the metadata and the customer with which the endpoint 102 is associated with.

In various embodiments, the metadata collected by the connector application 110 from the endpoint process 140 can include one or more of signer name, signature timestamp, product name, product version, original file name, executable hash, Process ID (PID), process name, process owner, process running duration, and the like. The signer name can be a company which authored the piece of software (endpoint process 140), for example, Google would be the signer name of the Chrome web browser application. A signature timestamp can certify a processes execution at a point in time with added levels of assurance. The product name can be the name of the endpoint process being used for the request. A product version can also be extracted and forwarded to the cloud 120 for determination that a latest version or an approved version of the endpoint process 140 is being utilized. The original file name can be utilized to determine the name issued to the process when it was created, thus can be utilized to determine that the endpoint process 140 has not been renamed. Further, the executable hash or a cryptographic signature can be utilized to determine if the endpoint process 140 matches what is expected and verify that the endpoint process 140 is legitimate. Additionally, the PID, process name, process owner, and other properties of an endpoint process 140 can be forwarded to the cloud 120 for identification purposes and the like. The process running duration can be utilized to determine how long an endpoint process has been running on the endpoint 102, which can be utilized in policy enforcement and risk assessments.

By utilizing the present systems and methods, zero trust policy can be extended down to an application level. That is, based on the metadata forwarded by the connector application 110, the cloud 120 can determine what endpoint process 140 an endpoint 102 is using, and can thus enforce zero trust policy based thereon. For example, various endpoint processes 140 can be trusted whereas others can be untrusted, and traffic can be either allowed or blocked based thereon. In a use case, if an endpoint is attempting to access a sensitive destination, i.e., a destination having sensitive data therein, the cloud 120 can restrict access to such destinations based on the endpoint process 140 which the endpoint 102 is using. Similarly, the cloud 120 can restrict access and/or only allow access to various destinations based on the endpoint process 140 identified via the endpoint process metadata.

For example, the cloud 120 can be configured to only allow access to sensitive destinations via a trusted corporate provided web browser of a latest or approved version regardless of header information. In this example, the cloud 120 processes the endpoint process metadata sent in-band with the traffic/request and determines that the endpoint process 140 used for the request is the corporate provided web browser, and is the latest or approved version of the corporate provided web browser. The cloud 120 can then allow the request/access based thereon. Similarly, the cloud

120 can block a request if it finds that either the endpoint process used to access the destination is not the trusted corporate provided web browser, or if the trusted corporate provided web browser is not of the latest version or an approved version. In such cases, the cloud 120 can communicate a reason for blocking the request to the connector application 110, which can then provide a UI for a user of the endpoint explaining the reason for blocking the request. Users can then solve any endpoint process deficiencies by using a different endpoint process, updating the endpoint process, etc. Additionally, the connector application 110 can be adapted to automatically update an endpoint process such as a corporate provided web browser responsive to receiving a reason of the blocking from the cloud 120, thereby resolving the issue without user intervention. This process is useful for endpoints which users do not have access to on a regular basis.

In various embodiments, the present systems can utilize the provided endpoint process metadata for determining if Transport Layer Security (TLS) decryption, or other inspection feature, is necessary. For example, based on the endpoint process metadata of the endpoint process originating the request, the present systems can choose to bypass TLS decryption or bypass any other cloud inspection engines. In one use case, if the systems determine that the endpoint process originating a request is a corporate provided web browser of the latest or approved version and does not show any signs of maliciousness, i.e., based on the executable hash or cryptographic signature, the systems can decide to bypass TLS decryption or any other cloud inspection engines. Again, the risk associated with the destination of the request can also weigh into such decisions. For example, the destination can be considered a sensitive destination or not a sensitive destination, the systems can use such information in the deciding.

By utilizing the endpoint process metadata, more granular data protection can be enforced by the cloud 120. That is, the cloud 120 can enforce specific policies and/or services such as DLP, access control policies, etc. based on the endpoint process 140 which the endpoint 102 is using for the connection. For example, if an endpoint is using an unsanctioned application for accessing the internet, the cloud 120 can identify this, and enforce more strict DLP policy for the traffic. This provides an additional dimension for data protection and security.

In addition to utilizing the metadata for enforcing policy on traffic, the present systems and methods include utilizing the metadata for visibility and inventory management. Many organizations have difficulty managing their software, endpoints, resources, etc. This is because they do not have good visibility that would stop them from having to inventory everything they have. Alternatively, it is much more useful to inventory everything that is in use, i.e., endpoint processes 140 in use by their endpoints 102. That is, the present systems can utilize the metadata forwarded to the cloud 120 to log and inventory all applications, software, etc. running on, and sending traffic from a customer's endpoints. The cloud 120 can then provide each customer an inventory of all endpoint processes 140 being utilized on their endpoints 102 based on the logging.

Again, the cloud 120 can enforce user application and web browser version control. Many vulnerabilities can be introduced because of users not updating their software on time. Thus, the present systems introduce another level of protection by enforcing software version control. For example, the cloud 120 can block an endpoint from browsing the internet unless the web browser, or other software, used for the connection is updated.

For endpoints 102 such as IoT devices, because such endpoints 102 run very specific standard software, the systems can utilize the metadata for verification that the software is up to date, the correct software, not tampered with, etc.

§ 5.1 Process for Endpoint Process Based Policy Enforcement and Logging

Figure 6:
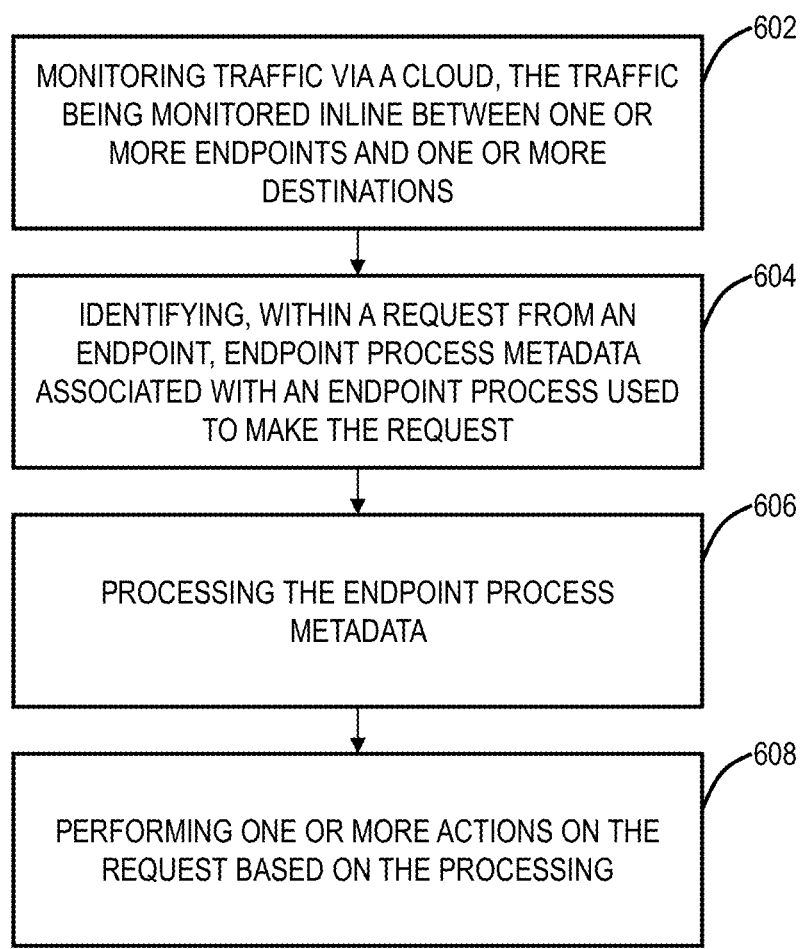
FIG. 6 is a flow chart of a process for endpoint application metadata based policy enforcement.

FIG. 6 is a flow chart of a process 600 for endpoint application metadata based policy enforcement. The process 600 includes monitoring traffic via a cloud, the traffic being monitored inline between one or more endpoints and one or more destinations (step 602); identifying, within a request from an endpoint, endpoint process metadata associated with an endpoint process used to make the request (step 604); processing the endpoint process metadata (step 606); and performing one or more actions on the request based on the processing (step 608).

The process 600 can further include wherein the one or more actions include blocking the request, allowing the request, and alerting a user of the endpoint. The request can be forwarded to the cloud via a connector application executing on the endpoint. The connector application can be adapted to collect endpoint process metadata from an end-point process used to make the request. The connector application can be adapted to forward the endpoint process metadata to the cloud in-band with the request. The endpoint process metadata can include one or more of a signor name, signature timestamp, product name, product version, original file name, executable hash, Process Identity (PID), process name, process owner, process running duration, and other properties of the endpoint process. When the endpoint process metadata includes the product version of the end-point process, the steps can further include processing the endpoint process metadata to determine if the product version of the endpoint process is the latest version available or an approved version; and performing one or more actions on the request based thereon. Responsive to determining the product version of the endpoint process is not the latest version available or an approved version, the steps can include blocking the request and alerting a user of the endpoint. The steps can further include logging the endpoint process metadata. The steps can further include providing a customer of the cloud with an inventory of all endpoint processes being utilized on their endpoints based on the logging.

$6.0 Conclusion

It will be appreciated that some embodiments described herein may include one or more generic or specialized processors ("one or more processors") such as microproces-sors; Central Processing Units (CPUs); Digital Signal Pro-cessors (DSPs): customized processors such as Network Processors (NPs) or Network Processing Units (NPUs), Graphics Processing Units (GPUs), or the like; Field Pro-grammable Gate Arrays (FPGAs); and the like along with unique stored program instructions (including software and/or firmware) for control thereof to implement, in conjunc-tion with certain non-processor circuits, some, most, or all of the functions of the methods and/or systems described herein. Alternatively, some or all functions may be imple-mented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry config-ured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodi-ments.

Moreover, some embodiments may include a non-transi-tory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instruc-tions executable by a processor or device (e.g., any type of programmable circuitry or logic) that, in response to such execution, cause a processor or the device to perform a set of operations, steps, methods, processes, algorithms, func-tions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including indi-vidually as well as combinations of less than all of the various elements, operations, steps, methods, processes, algorithms, functions, techniques, modules, circuits, etc.

What is claimed is:

1. A method comprising steps of:

monitoring traffic, via a cloud-based security service executed by one or more processors of a server, the traffic being monitored inline between one or more endpoints and one or more destinations;

identifying, by the cloud-based security service, within a request from an endpoint, endpoint process metadata associated with an endpoint process used to make the request, wherein the endpoint process metadata includes one or more of a signor name, signature timestamp, product name, product version, original file name, executable hash, Process Identity (PID), process name, process owner, and process running duration of the endpoint process;

processing, by the cloud-based security service, the end-point process metadata which includes the product version, the processing includes determining if the product version of the endpoint process is a latest version available; and responsive to the processing, performing, by the cloud-based security service, one or more security actions on the request, including at least one of blocking the request, allowing the request, bypassing Transport Layer Security (TLS) decryption for the request, and alerting a user of the endpoint via a connector application.

2. The method of claim 1, wherein the request is forwarded to the cloud-based security service via the connector application executing on the endpoint.

3. The method of claim 2, wherein the connector application is adapted to collect endpoint process metadata from an endpoint process used to make the request.

4. The method of claim 3, wherein the connector application is adapted to forward the endpoint process metadata to the cloud-based security service in-band with the request.

5. The method of claim 1, wherein responsive to determining the product version of the endpoint process is not the latest version available, blocking the request and alerting a user of the endpoint.

6. The method of claim 1, wherein the steps further comprise:

logging the endpoint process metadata.

7. The method of claim 6, wherein the steps further comprise:

providing a customer of the cloud-based security service with an inventory of all endpoint processes being utilized on their endpoints based on the logging.

8. A non-transitory computer-readable medium comprising instructions that, when executed, cause one or more processors of a cloud-based security service to perform steps of:

monitoring traffic, via the cloud-based security service, the traffic being monitored inline between one or more endpoints and one or more destinations;

identifying, by the cloud based security service, within a request from an endpoint, endpoint process metadata associated with an endpoint process used to make the request, wherein the endpoint process metadata includes one or more of a signor name, signature timestamp, product name, product version, original file name, executable hash, Process Identity (PID), process name, process owner, and process running duration of the endpoint process;

processing, by the cloud-based security service, the endpoint process metadata which includes the product version, the processing includes determining if the product version of the endpoint process is a latest version available; and responsive to the processing, performing, by the cloud-based security service, one or more security actions on the request, including at least one of blocking the request, allowing the request, bypassing Transport Layer Security (TLS) decryption for the request, and alerting a user of the endpoint via a connector application.

9. The non-transitory computer-readable medium of claim 8, wherein the request is forwarded to the cloud-based security service via the connector application executing on the endpoint.

10. The non-transitory computer-readable medium of claim 9, wherein the connector application is adapted to collect endpoint process metadata from an endpoint process used to make the request.

11. The non-transitory computer-readable medium of claim 10, wherein the connector application is adapted to forward the endpoint process metadata to the cloud-based security service in-band with the request.

12. The non-transitory computer-readable medium of claim 8, wherein responsive to determining the product version of the endpoint process is not the latest version available, blocking the request and alerting a user of the endpoint.

13. The non-transitory computer-readable medium of claim 8, wherein the steps further comprise:

logging the endpoint process metadata.

14. The non-transitory computer-readable medium of claim 13, wherein the steps further comprise:

providing a customer of the cloud-based security service with an inventory of all endpoint processes being utilized on their endpoints based on the logging.

* * * * *